(12) United States Patent
Wen et al.

(10) Patent No.: US 12,343,803 B2
(45) Date of Patent: Jul. 1, 2025

(54) RETAINING MEMBER AND CUTTING TOOL

(71) Applicant: Sumitomo Electric Hardmetal Corp., Itami (JP)

(72) Inventors: Yifan Wen, Itami (JP); Yosuke Shimamoto, Itami (JP); Naoya Tsuda, Itami (JP); Yasuhiko Okita, Itami (JP); Taiga Sueyoshi, Itami (JP); Junya Okida, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 673 days.

(21) Appl. No.: 17/639,907

(22) PCT Filed: Mar. 2, 2021

(86) PCT No.: PCT/JP2021/007821
§ 371 (c)(1),
(2) Date: Mar. 3, 2022

(87) PCT Pub. No.: WO2022/185396
PCT Pub. Date: Sep. 9, 2022

(65) Prior Publication Data
US 2023/0158579 A1    May 25, 2023

(51) Int. Cl.
*B23B 27/16* (2006.01)
*B23B 27/10* (2006.01)
(52) U.S. Cl.
CPC .......... *B23B 27/1666* (2013.01); *B23B 27/10* (2013.01)

(58) Field of Classification Search
CPC ..... B23B 27/10; B23B 27/16; B23B 2250/12; B23B 2260/03; B23Q 11/10
See application file for complete search history.

(56) References Cited

U.S. PATENT DOCUMENTS

| 4,621,547 | A  | * | 11/1986 | Yankoff ................. B23B 27/167 407/11 |
| 4,848,198 | A  |   | 7/1989  | Royal et al. |
| 9,387,537 | B2 | * | 7/2016  | Hoffer .................... B23Q 11/10 |
| 10,661,352 | B2 | * | 5/2020  | Kaufmann ............ B23B 27/083 |

(Continued)

FOREIGN PATENT DOCUMENTS

| DE | 102015104414 A1 | 10/2015 |
| DE | 112017004141 T5 | 5/2019 |

(Continued)

*Primary Examiner* — Nicole N Ramos
(74) *Attorney, Agent, or Firm* — XSENSUS LLP

(57) ABSTRACT

The boundary flow path is constituted of a pair of boundary wall surfaces facing each other in a first cross section intersecting each of the first flow path, the boundary flow path, and the second flow path. An inclination of a tangent to at least one of the pair of boundary wall surfaces is continuously changed. In a second cross section perpendicular to a direction in which coolant flows, a lateral width of the first flow path is larger than a longitudinal width of the first flow path and a lateral width of the second flow path is larger than a longitudinal width of the second flow path when a longitudinal direction represents a direction in which the pair of boundary wall surfaces face each other and a lateral direction represents a direction perpendicular to the longitudinal direction.

20 Claims, 16 Drawing Sheets

(56) References Cited

U.S. PATENT DOCUMENTS

| | | | |
|---|---|---|---|
| 11,344,953 B2 * | 5/2022 | Hirano | .................... B23B 27/10 |
| 2007/0283794 A1 | 12/2007 | Giannetti | |
| 2011/0305531 A1 | 12/2011 | Amstibovitsky et al. | |
| 2016/0175938 A1 * | 6/2016 | Kaufmann | .............. B23B 27/10 407/11 |
| 2018/0161885 A1 | 6/2018 | Forsberg et al. | |
| 2019/0184467 A1 | 6/2019 | Nagae | |
| 2019/0366444 A1 | 12/2019 | Henzler et al. | |
| 2020/0230710 A1 | 7/2020 | Hirano et al. | |

FOREIGN PATENT DOCUMENTS

| | | | | |
|---|---|---|---|---|
| EP | 3219421 A1 | 9/2017 | | |
| JP | 2019-206075 A | 12/2019 | | |
| KR | 20190079920 A * | 7/2019 | ............. | B23Q 11/10 |
| KR | 10-2020-0081780 A1 | 7/2020 | | |
| WO | 2019/021605 A1 | 1/2019 | | |

* cited by examiner

RETAINING MEMBER AND CUTTING TOOL

CROSS-REFERENCE TO RELATED APPLICATION

The present application is based on PCT filing PCT/JP2021/007821, filed Mar. 2, 2021, the entire contents of which are incorporated herein by reference.

TECHNICAL FIELD

The present disclosure relates to a retaining member and a cutting tool.

BACKGROUND ART

WO 2019/021605 (PTL 1) describes a cutting tool holder that supports a cutting insert. The cutting tool holder has a retaining member for positioning the cutting insert in a holder main body and fixing the cutting insert thereto.

CITATION LIST

Patent Literature

PTL 1: WO 2019/021605

SUMMARY OF INVENTION

A retaining member according to the present disclosure is a retaining member for fixing a cutting insert to a holder, and includes a first main body portion, a second main body portion, and a third main body portion. In the first main body portion, a coolant inflow opening is formed. In the second main body portion, a coolant ejection opening is formed. The third main body portion is located between the first main body portion and the second main body portion. A first flow path is formed in the first main body portion so as to be contiguous to the coolant inflow opening and extend along a first direction. A second flow path is formed in the second main body portion so as to be contiguous to the coolant ejection opening and extend along a second direction inclined with respect to the first direction. A boundary flow path is formed in the third main body portion so as to be contiguous to each of the first flow path and the second flow path. The boundary flow path is constituted of a pair of boundary wall surfaces facing each other in a first cross section intersecting each of the first flow path, the boundary flow path, and the second flow path. An inclination of a tangent to at least one of the pair of boundary wall surfaces is continuously changed. In a second cross section perpendicular to a direction in which the coolant flows, a lateral width of the first flow path is larger than a longitudinal width of the first flow path and a lateral width of the second flow path is larger than a longitudinal width of the second flow path when a longitudinal direction represents a direction in which the pair of boundary wall surfaces face each other and a lateral direction represents a direction perpendicular to the longitudinal direction.

DETAILED DESCRIPTION

Figure 1:
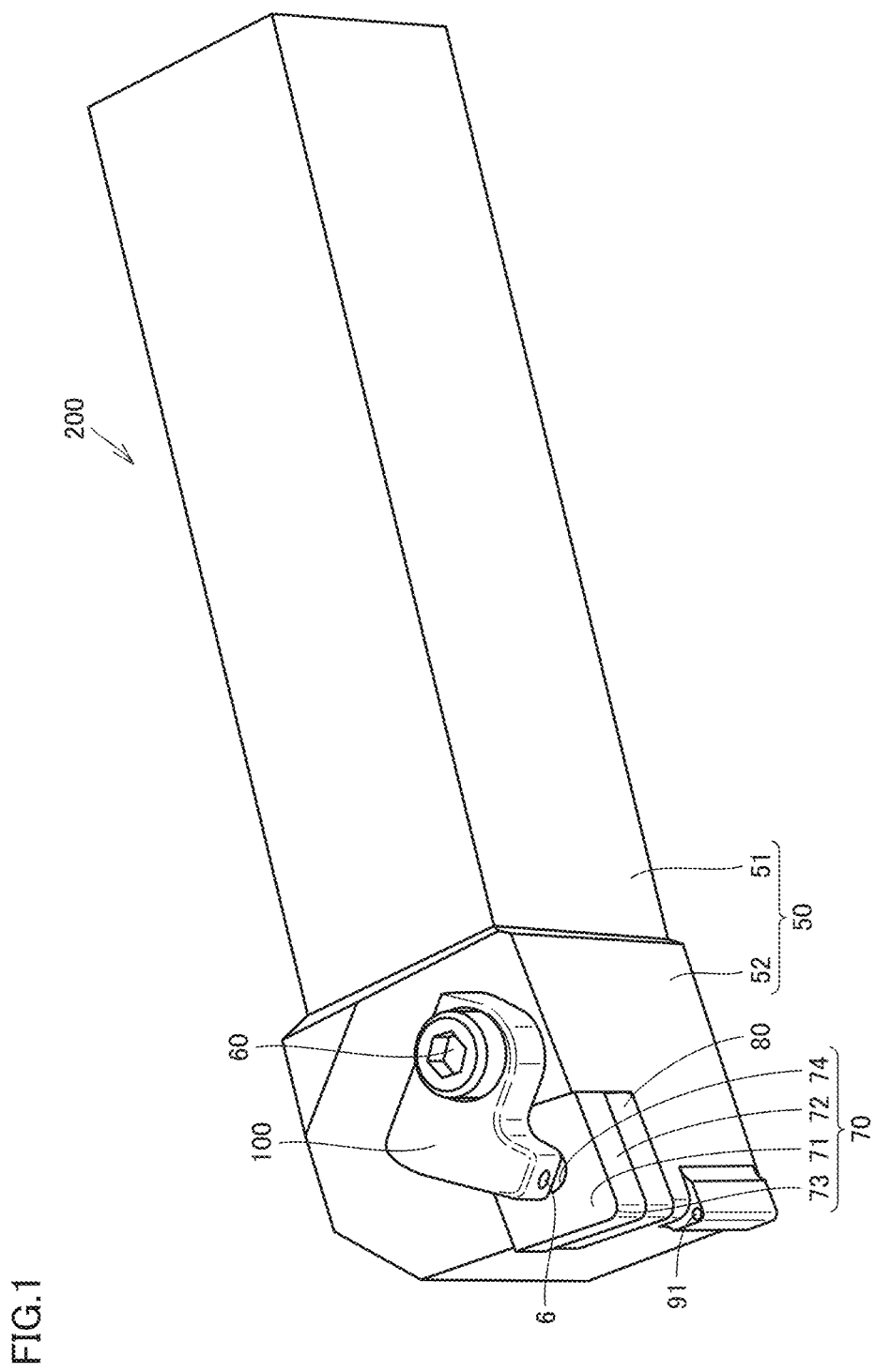
FIG. 1 is a schematic perspective view showing a configuration of a cutting tool according to a first embodiment.

Problem to be Solved by the Present Disclosure

It is an object of the present disclosure to provide a retaining member and a cutting tool to reduce energy loss of a fluid.

Advantageous Effect of the Present Disclosure

According to the present disclosure, there can be provided a retaining member and a cutting tool to reduce energy loss of a fluid.

DESCRIPTION OF EMBODIMENTS

First, embodiments of the present disclosure are listed and described.

(1) A retaining member 100 according to the present disclosure is a retaining member 100 for fixing a cutting insert 70 to a holder 50, and includes a first main body portion 1, a second main body portion 2, and a third main body portion 3. In first main body portion 1, a coolant inflow opening 5 is formed. In second main body portion 2, a coolant ejection opening 6 is formed. Third main body portion 3 is located between first main body portion 1 and second main body portion 2. A first flow path 10 is formed in first main body portion 1 so as to be contiguous to coolant inflow opening 5 and extend along a first direction D1. A second flow path 20 is formed in second main body portion 2 so as to be contiguous to coolant ejection opening 6 and extend along a second direction D2 inclined with respect to first direction D1. A boundary flow path 30 is formed in third main body portion 3 so as to be contiguous to each of first flow path 10 and second flow path 20. Boundary flow path 30 is constituted of a pair of boundary wall surfaces 33 facing each other in a first cross section S1 intersecting each of first flow path 10, boundary flow path 30, and second flow path 20. An inclination of a tangent to at least one of the pair of boundary wall surfaces 33 is continuously changed. In a second cross section S2 perpendicular to a direction in which the coolant flows, a lateral width of first flow path 10 is larger than a longitudinal width of first flow path 10 and a lateral width of second flow path 20 is larger than a longitudinal width of second flow path 20 when a longitudinal direction represents a direction in which the pair of boundary wall surfaces 33 face each other and a lateral direction represents a direction perpendicular to the longitudinal direction.

(2) According to retaining member 100 according to (1), first flow path 10 may have a narrowed portion 41 in which the lateral width of first flow path 10 is monotonously decreased in a direction toward second flow path 20.

(3) According to retaining member 100 according to (2), in a third cross section S3 parallel to each of first direction D1 and the lateral direction, narrowed portion 41 may be constituted of a first side surface 11 and a second side surface 12 facing each other. First side surface 11 may be in a form of a straight line and second side surface 12 may be in a form of a curve.

(4) According to retaining member 100 according to (2), in a third cross section S3 parallel to each of first direction D1 and the lateral direction, narrowed portion 41 may be constituted of a first side surface 11 and a second side surface 12 facing each other. Each of first side surface 11 and second side surface 12 may be in a form of a straight line. Each of first side surface 11 and second side surface 12 may be inclined with respect to first direction D1.

(5) Retaining member 100 according to any one of (1) to (4) may further include a cylindrical portion 4 protruding from second main body portion 2. In first cross section S1, an ejection surface in which coolant ejection opening 6 is formed may be parallel to a central axis A of cylindrical portion 4.

(6) According to retaining member 100 according to any one of (1) to (5), in first cross section S1, second flow path 20 may be constituted of a third side surface 23 and a fourth side surface 24 facing each other. Third side surface 23 may have a first wall surface 21 separated by more than or equal to 1 mm from coolant ejection opening 6. Fourth side surface 24 may have a second wall surface 22 separated by more than or equal to 1 mm from coolant ejection opening 6. First wall surface 21 may be parallel to second wall surface 22.

(7) According to retaining member 100 according to (1), first flow path 10 may have a narrowed portion 41 in which the lateral width of first flow path 10 is monotonously decreased in a direction toward second flow path 20. Retaining member 100 may further include a cylindrical portion 4 protruding from second main body portion 2. In first cross section S1, an ejection surface in which coolant ejection opening 6 is formed may be parallel to a central axis A of cylindrical portion 4. In first cross section S1, second flow path 20 may be constituted of a third side surface 23 and a fourth side surface 24 facing each other. Third side surface 23 may have a first wall surface 21 separated by more than or equal to 1 mm from coolant ejection opening 6. Fourth side surface 24 may have a second wall surface 22 separated by more than or equal to 1 mm from coolant ejection opening 6. First wall surface 21 may be parallel to second wall surface 22.

(8) A cutting tool 200 according to the present disclosure includes: retaining member 100 according to any one of (1) to (7); and holder 50 on which retaining member 100 is disposed.

(9) Cutting tool 200 according to (8) may further include cutting insert 70 in contact with retaining member 100.

Details of Embodiments of the Present Disclosure

Next, details of the embodiments of the present disclosure will be described with reference to figures. In the below-described figures, the same or corresponding portions are denoted by the same reference characters and will not be described repeatedly.

First Embodiment

First, a configuration of a cutting tool 200 according to a first embodiment of the present disclosure will be described.

FIG. 1 is a schematic perspective view showing the configuration of cutting tool 200 according to the first embodiment. As shown in FIG. 1, cutting tool 200 according to the first embodiment mainly includes a holder 50, a cutting insert 70, a retaining member 100, an underlying plate 80, and a fastening member 60. Holder 50 has an insert holding portion 52 and a supporting portion 51. Insert holding portion 52 is contiguous to supporting portion 51. Cutting insert 70, underlying plate 80, retaining member 100, and fastening member 60 are disposed at insert holding portion 52. Supporting portion 51 is attached to, for example, a machine tool.

Cutting insert 70 has a top surface 71, an outer peripheral surface 72, and a cutting edge 73. At least a portion of top surface 71 functions as a rake face. At least a portion of outer peripheral surface 72 functions as a flank face. A ridgeline between top surface 71 and outer peripheral surface 72 forms cutting edge 73. When viewed in a direction perpendicular to top surface 71, the outer shape of top surface 71 is substantially a shape of parallelogram. A hole portion 74 is formed in top surface 71. Cutting insert 70 is in contact with retaining member 100. Retaining member 100 covers a portion of top surface 71 of cutting insert 70. Retaining member 100 fixes cutting insert 70 to holder 50. Retaining member 100 positions cutting insert 70. Retaining member 100 is fixed to holder 50 by fastening member 60. Cutting insert 70 is in contact with underlying plate 80. Underlying plate 80 is located between cutting insert 70 and holder 50. Underlying plate 80 is in contact with holder 50.

Retaining member 100 is provided with a coolant ejection opening 6. Coolant ejection opening 6 faces a corner portion of cutting edge 73 of cutting insert 70. Insert holding portion 52 of holder 50 is provided with a coolant sending-out opening 91. Coolant sending-out opening 91 faces the corner portion of cutting edge 73 of cutting insert 70. Coolant sent out from coolant ejection opening 6 is sent out from the top surface 71 side (upper side) of cutting insert 70 toward cutting edge 73. The coolant sent out from coolant sending-out opening 91 is sent out from the outer peripheral surface 72 side (lower side) of cutting insert 70 toward cutting edge 73.

Figure 2:
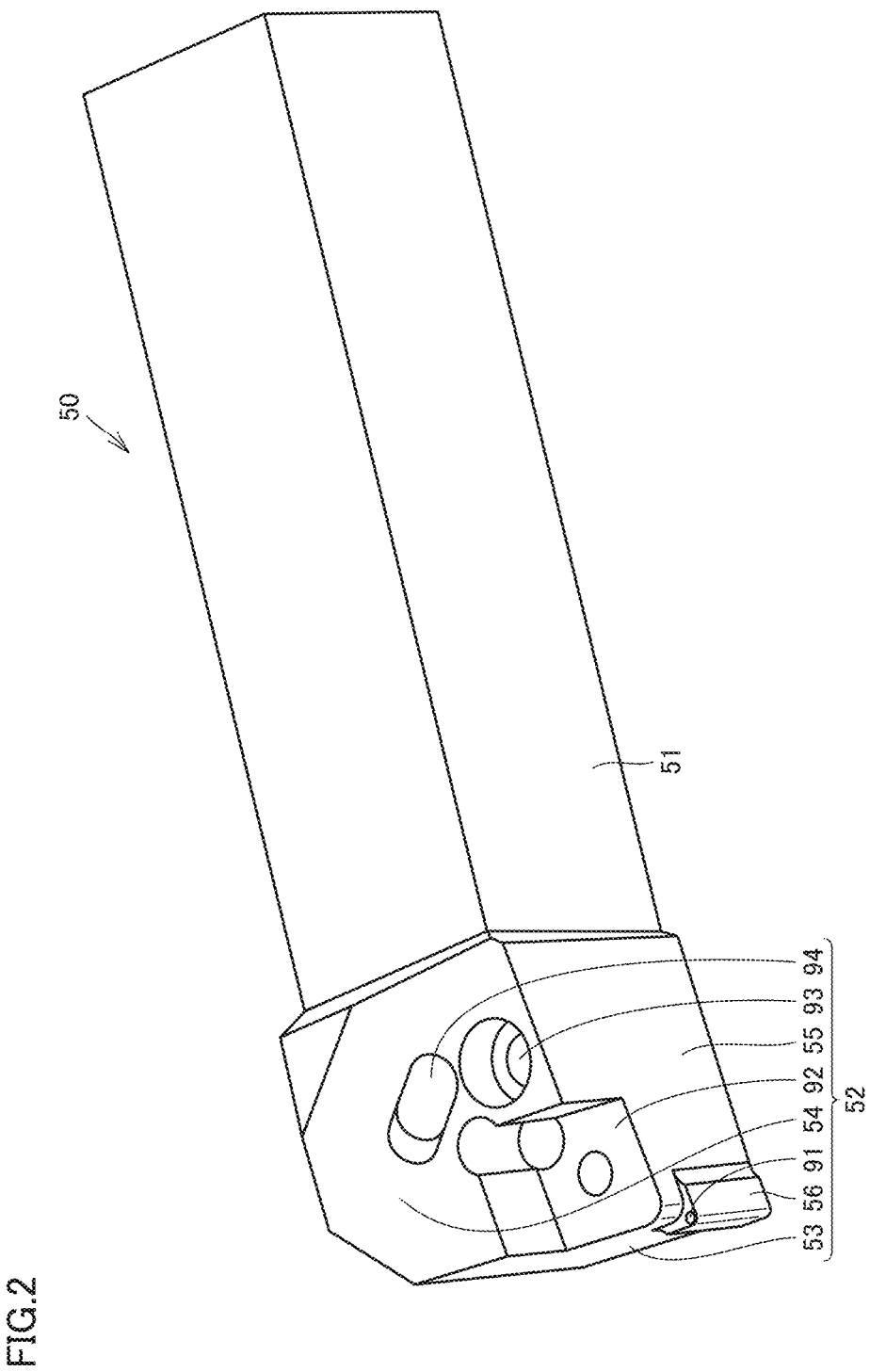
FIG. 2 is a schematic perspective view showing a configuration of a holder of the cutting tool according to the first embodiment.

FIG. 2 is a schematic perspective view showing a configuration of holder 50 of cutting tool 200 according to the first embodiment. As shown in FIG. 2, insert holding portion 52 of holder 50 of cutting tool 200 according to the first embodiment has an upper surface 54, a first end surface 53, and a second end surface 55. Upper surface 54 is contiguous to each of first end surface 53 and second end surface 55. First end surface 53 is contiguous to second end surface 55. A protrusion 56 is provided at a boundary between first end surface 53 and second end surface 55. Protrusion 56 is provided with coolant sending-out opening 91.

Insert holding portion 52 is provided with a second recess 92, a third recess 93, and a fourth recess 94. Cutting insert 70 and underlying plate 80 are disposed in second recess 92. Second recess 92 is exposed at each of first end surface 53, second end surface 55, and upper surface 54. Third recess 93 is provided in upper surface 54. A portion of fastening member 60 is disposed in third recess 93. Fourth recess 94 is provided in upper surface 54. A portion of retaining member 100 is disposed in fourth recess 94.

Figure 3:
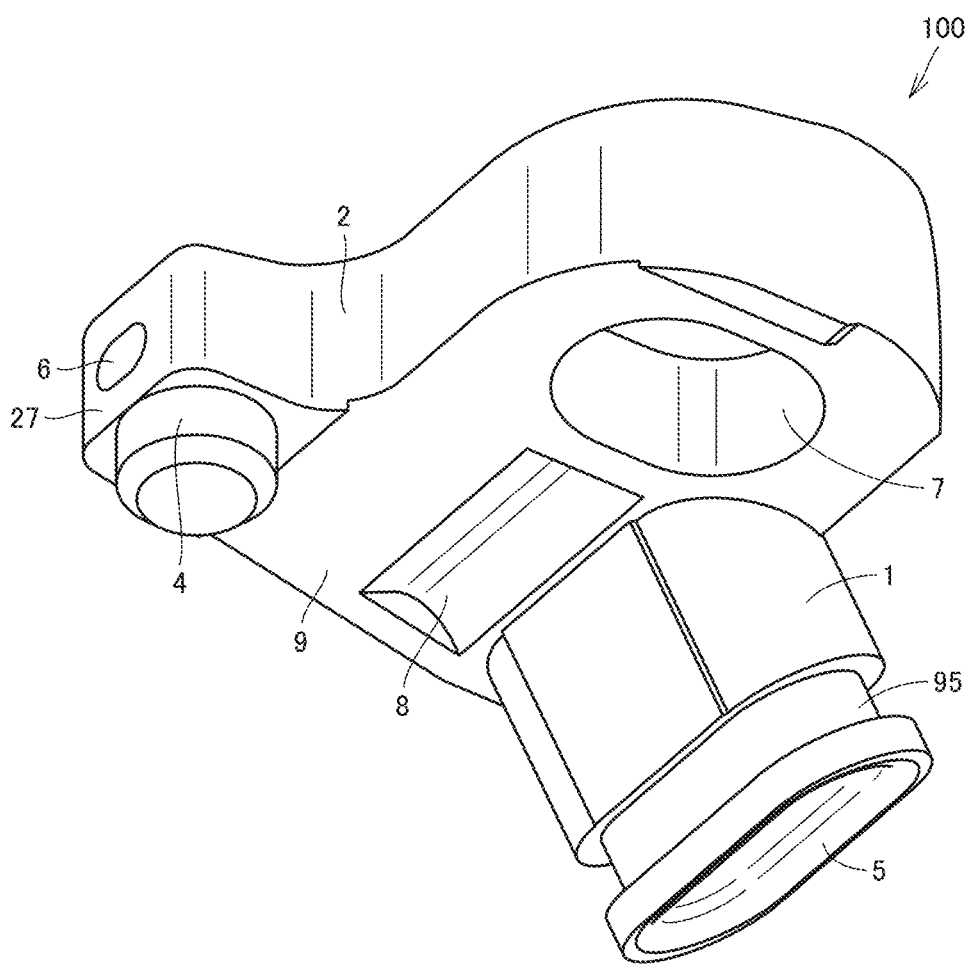
FIG. 3 is a schematic perspective view showing a configuration of a retaining member according to the first embodiment.
Figure 4:
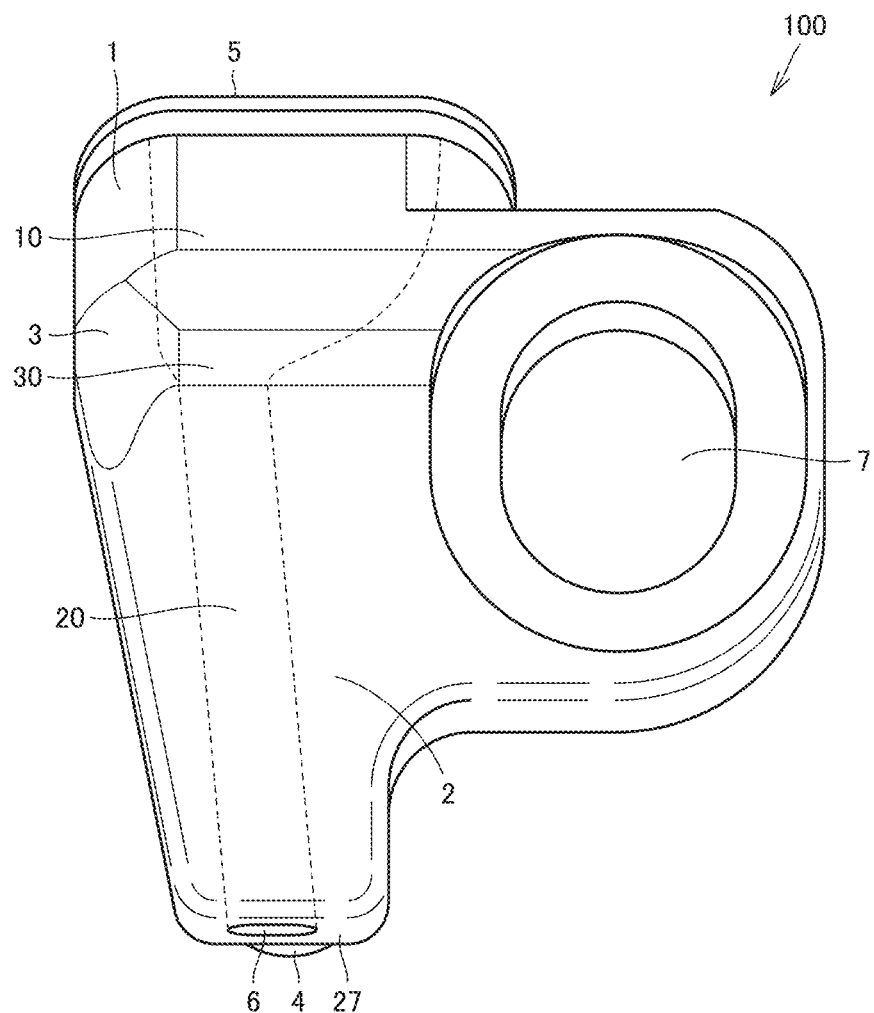
FIG. 4 is a schematic plan view showing the configuration of the retaining member according to the first embodiment.

Next, a configuration of retaining member 100 according to the first embodiment of the present disclosure will be described. FIG. 3 is a schematic perspective view showing the configuration of retaining member 100 according to the first embodiment. FIG. 4 is a schematic plan view showing the configuration of retaining member 100 according to the first embodiment.

As shown in FIGS. 3 and 4, retaining member 100 according to the first embodiment mainly includes a first main body portion 1, a second main body portion 2, a third main body portion 3, a cylindrical portion 4, and a bottom surface 9. A coolant inflow opening 5 is formed in first main body portion 1. Coolant inflow opening 5 is a portion via which coolant is introduced into retaining member 100. The coolant is introduced from fourth recess 94 of holder 50 into retaining member 100. Coolant ejection opening 6 is formed in second main body portion 2. Coolant ejection opening 6 is a portion via which the coolant is sent out from retaining member 100. Third main body portion 3 is located between first main body portion 1 and second main body portion 2.

Retaining member 100 is provided with a through hole 7. Fastening member 60 is inserted into through hole 7. Retaining member 100 is fixed to holder 50 by fastening member 60. Bottom surface 9 is disposed to face top surface 71 of cutting insert 70. Bottom surface 9 is provided with a first recess 8. First main body portion 1 is provided to protrude from bottom surface 9. First main body portion 1 is a tubular member. An annular groove 95 is provided in the outer peripheral surface of first main body portion 1. Cylindrical portion 4 protrudes from second main body portion 2. Cylindrical portion 4 extends in a direction substantially perpendicular to bottom surface 9. Cylindrical portion 4 is disposed in hole portion 74 provided in top surface 71 of cutting insert 70.

As shown in FIG. 4, a first flow path 10 is formed in first main body portion 1. A second flow path 20 is formed in second main body portion 2. A boundary flow path 30 is formed in third main body portion 3. Boundary flow path 30 is contiguous to each of first flow path 10 and second flow path 20. The coolant having entered first flow path 10 flows into second flow path 20 via boundary flow path 30. Coolant ejection opening 6 is provided in an ejection surface 27 of second main body portion 2.

Figure 5:
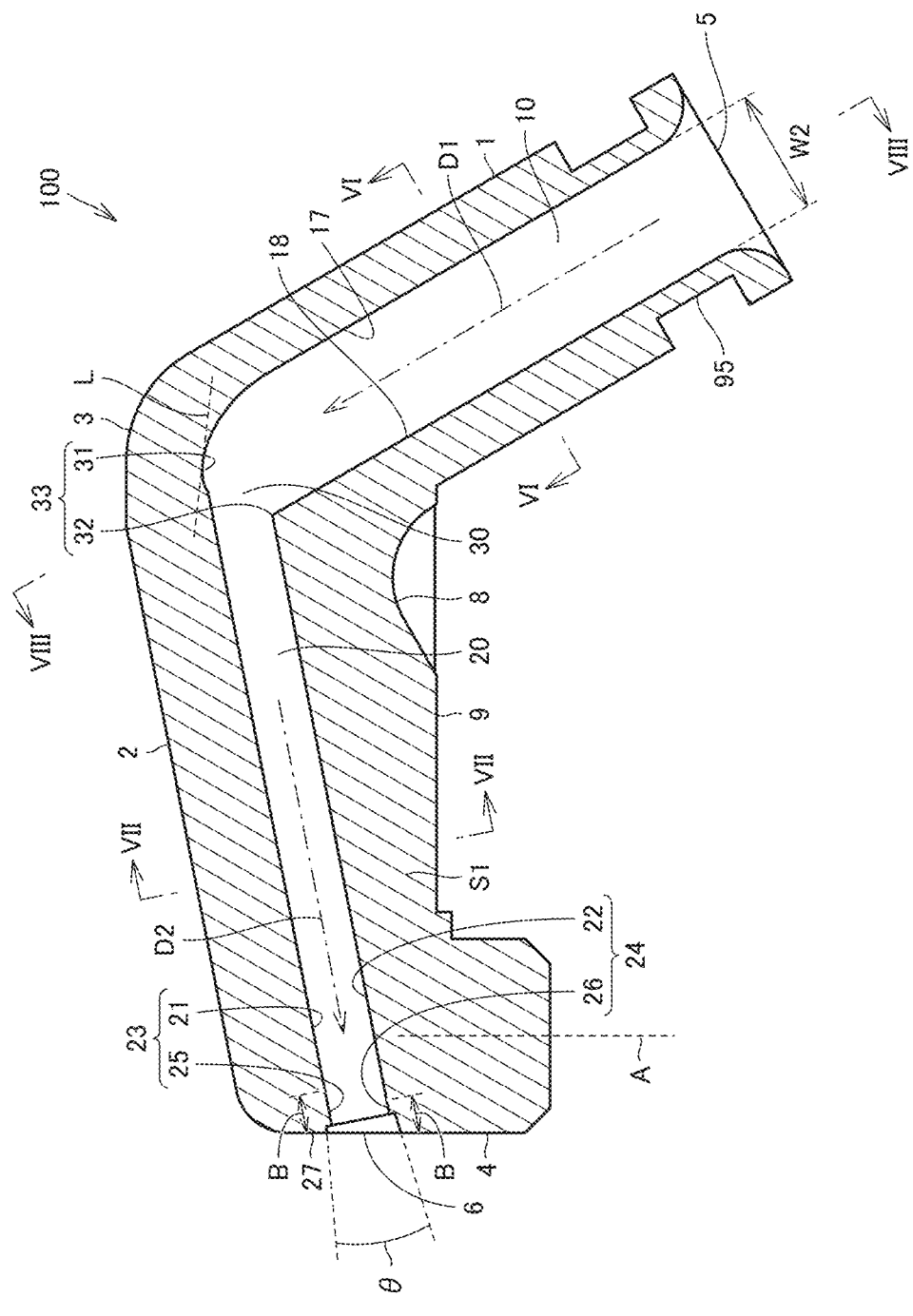
FIG. 5 is a schematic cross sectional view showing a first cross section of the retaining member according to the first embodiment.

FIG. 5 is a schematic cross sectional view showing a first cross section S1 of retaining member 100 according to the first embodiment. First cross section S1 intersects each of first flow path 10, boundary flow path 30, and second flow path 20. As shown in FIG. 5, first flow path 10 is contiguous to coolant inflow opening 5. First flow path 10 extends along a first direction D1. Second flow path 20 is contiguous to coolant ejection opening 6. Second flow path 20 extends along a second direction D2. Second direction D2 is inclined with respect to first direction D1. An angle between a straight line along first direction D1 and a straight line along second direction D2 may be more than or equal to 60° and less than or equal to 120°, for example.

As shown in FIG. 5, boundary flow path 30 is constituted of a pair of boundary wall surfaces 33 facing each other in first cross section S1. The pair of boundary wall surfaces 33 have a first boundary wall surface 31 and a second boundary wall surface 32. Second boundary wall surface 32 may be located between first boundary wall surface 31 and bottom surface 9. First boundary wall surface 31 is smoothly curved. From another viewpoint, it can be said that the inclination of a tangent L to first boundary wall surface 31 is continuously changed. First boundary wall surface 31 is curved to protrude on the outer side. Second boundary wall surface 32 may be bent sharply. From another viewpoint, it can be said that the inclination of a tangent to first boundary wall surface 31 may be discontinuously changed.

In first cross section S1, second flow path 20 is constituted of a third side surface 23 and a fourth side surface 24. Third side surface 23 and fourth side surface 24 face each other. Third side surface 23 has a first wall surface 21 and a fifth wall surface 25. Fifth wall surface 25 is a region of third side surface 23 extending to coolant ejection opening 6 from a position separated by 1 mm from coolant ejection opening 6. First wall surface 21 is a region of third side surface 23 separated by more than or equal to 1 mm from coolant ejection opening 6. First wall surface 21 is contiguous to fifth wall surface 25. A distance B from coolant ejection opening 6 to a boundary between first wall surface 21 and fifth wall surface 25 is 1 mm. A step may be provided in fifth wall surface 25.

Fourth side surface 24 has a second wall surface 22 and a sixth wall surface 26. Sixth wall surface 26 is a region of fourth side surface 24 extending to coolant ejection opening 6 from a position separated by 1 mm from coolant ejection opening 6. Second wall surface 22 is a region of fourth side surface 24 separated by more than or equal to 1 mm from coolant ejection opening 6. Second wall surface 22 is contiguous to sixth wall surface 26. A distance B from coolant ejection opening 6 to a boundary between second wall surface 22 and sixth wall surface 26 is 1 mm. A step may be provided in sixth wall surface 26. First wall surface 21 may be parallel to second wall surface 22.

As shown in FIG. 5, in first cross section S1, ejection surface 27 in which coolant ejection opening 6 is formed may be contiguous to cylindrical portion 4. Ejection surface 27 may be parallel to central axis A of cylindrical portion 4. Ejection surface 27 may be provided along the outer peripheral surface of cylindrical portion 4. Central axis A of cylindrical portion 4 may intersect second direction D2. The coolant is sent out from coolant ejection opening 6 at a divergence angle θ.

Third side surface 23 is contiguous to first boundary wall surface 31. Fourth side surface 24 is contiguous to second boundary wall surface 32. In first cross section S1, first flow path 10 is constituted of a seventh side surface 17 and an eighth side surface 18 facing each other. Seventh side surface 17 is contiguous to first boundary wall surface 31. Eighth side surface 18 is contiguous to second boundary wall surface 32. In first cross section S1, seventh side surface 17 is inclined with respect to first wall surface 21. In first cross section S1, eighth side surface 18 is inclined with respect to second wall surface 22.

Figure 6:
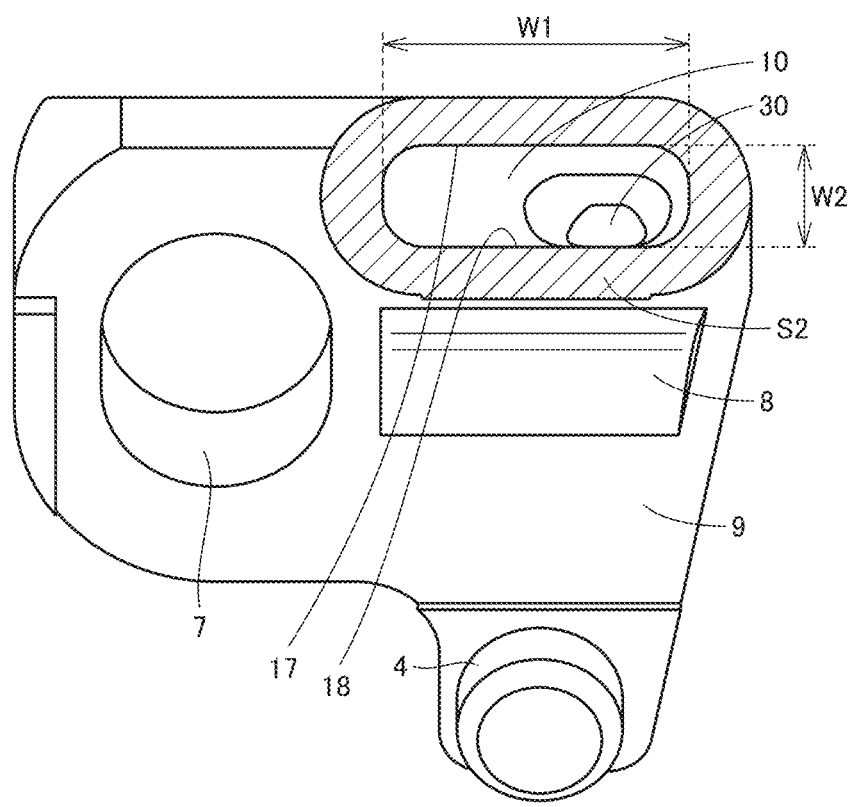
FIG. 6 is a schematic cross sectional view showing a configuration of a first main body portion in a second cross section perpendicular to a first direction.

FIG. 6 is a schematic cross sectional view showing a configuration of first main body portion 1 in a second cross section S2 perpendicular to first direction D1. The cross section shown in FIG. 6 corresponds to a cross section taken along a line VI-VI in FIG. 5. As shown in FIG. 6, in second cross section S2 perpendicular to the direction (first direction D1) in which coolant flows in first flow path 10, first flow path 10 formed in first main body portion 1 has an elongated shape. In second cross section S2, the lateral width (first width W1) of first flow path 10 is larger than the longitudinal width (second width W2) of first flow path 10. In second cross section S2 of first main body portion 1, a longitudinal direction represents a direction in which the pair of boundary wall surfaces 33 face each other. In first flow path 10, the direction in which the pair of boundary wall surfaces 33 face each other refers to a direction parallel to a direction from seventh side surface 17 toward eighth side surface 18. In second cross section S2 of first main body portion 1, a lateral direction represents a direction perpendicular to the longitudinal direction.

First width W1 may be 1.5 times or more and 4 times or less as large as second width W2, for example. The lower limit of first width W1 is not particularly limited, but may be, for example, 1.7 times or more or twice or more as large as second width W2. The upper limit of first width W1 is not particularly limited, but may be, for example, 3.8 times or less or 3.5 times or less as large as second width W2.

Figure 7:
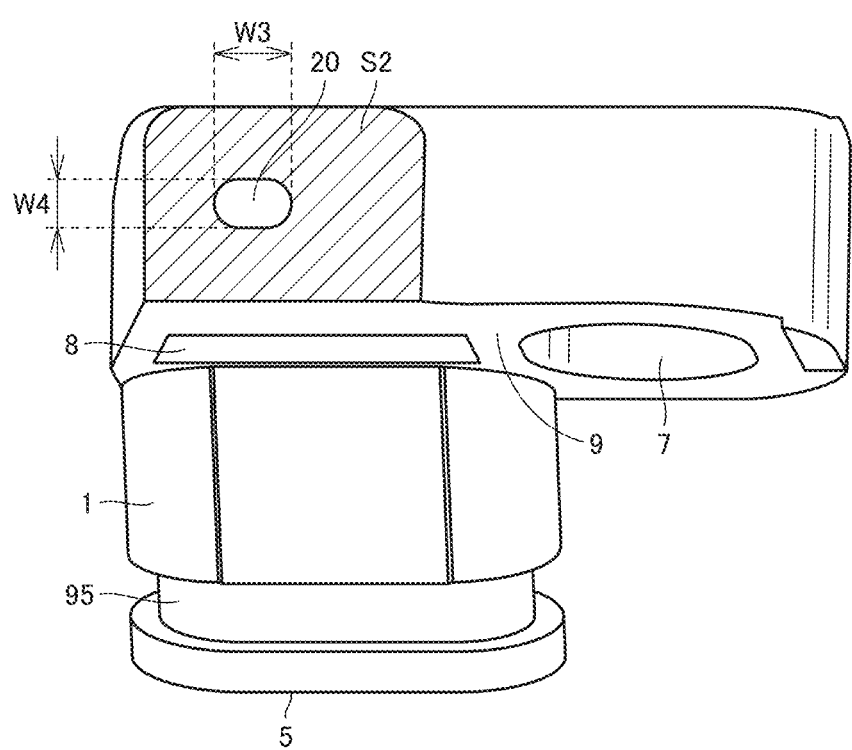
FIG. 7 is a schematic cross sectional view showing a configuration of a second main body portion in the second cross section perpendicular to a second direction.

FIG. 7 is a schematic cross sectional view showing a configuration of second main body portion 2 in second cross section S2 perpendicular to second direction D2. The cross section shown in FIG. 7 corresponds to a cross section taken along a line VII-VII in FIG. 5. As shown in FIG. 7, in second cross section S2 perpendicular to the direction (second direction D2) in which coolant flows in second flow path 20, second flow path 20 formed in second main body portion 2 has an elongated shape. In second cross section S2, the lateral width (third width W3) of second flow path 20 is larger than the longitudinal width (fourth width W4) of second flow path 20. In second cross section S2 of second main body portion 2, the longitudinal direction represents the direction in which the pair of boundary wall surfaces 33 face each other. In second flow path 20, the direction in which the pair of boundary wall surfaces 33 face each other refers to a direction parallel to a direction from third side surface 23 toward fourth side surface 24. In second cross section S2 of second main body portion 2, the lateral direction represents the direction perpendicular to the longitudinal direction. Third width W3 may be smaller than first width W1. Fourth width W4 may be smaller than second width W2.

Third width W3 may be 1.5 times or more and 4.0 times or less as large as fourth width W4, for example. The upper limit of third width W3 is not particularly limited, but may be 3.0 times or less or 2.5 times or less as large as fourth width W4, for example.

Figure 8:
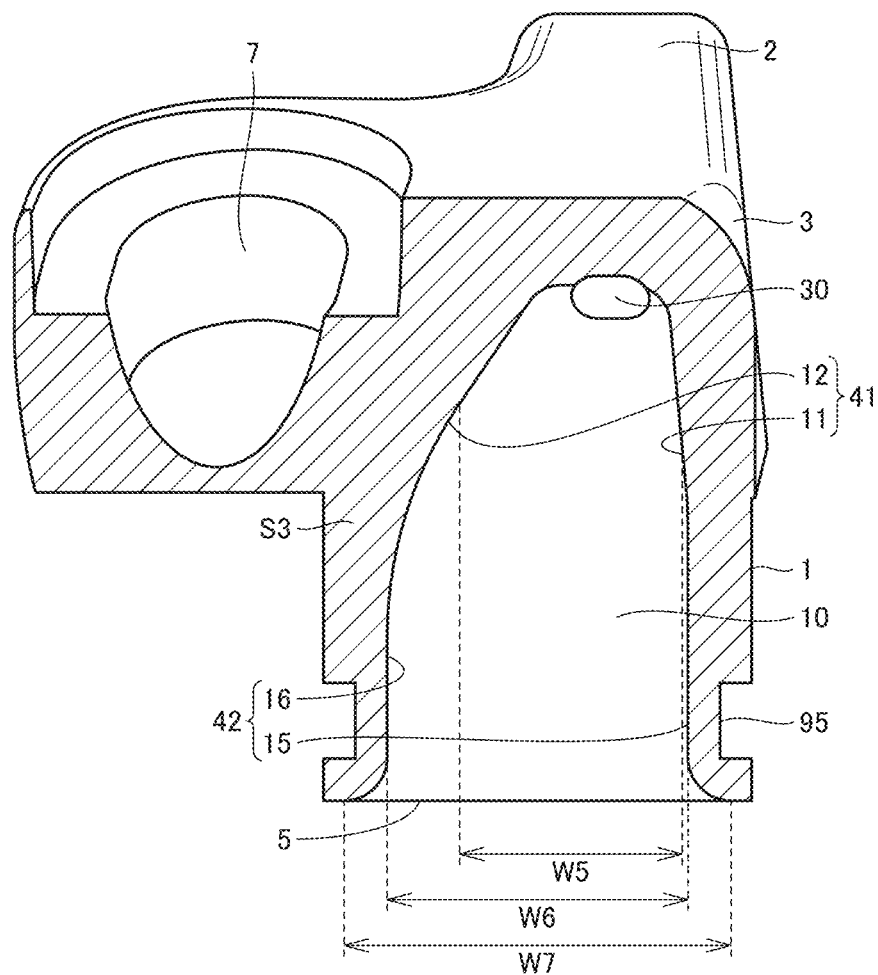
FIG. 8 is a schematic cross sectional view showing a third cross section of the retaining member according to the first embodiment.

FIG. 8 is a schematic cross sectional view showing a third cross section S3 of retaining member 100 according to the first embodiment. The cross section shown in FIG. 8 corresponds to a cross section taken along a line VIII-VIII in FIG. 5. Third cross section S3 is parallel to each of first direction D1 and the lateral direction of first flow path 10. As shown in FIG. 8, first flow path 10 has a narrowed portion 41 and a constant width portion 42. In narrowed portion 41, the lateral width of first flow path 10 is monotonously decreased in a direction toward second flow path 20. In third cross section S3, narrowed portion 41 is constituted of a first side surface 11 and a second side surface 12. First side surface 11 and second side surface 12 face each other. First side surface 11 may be in the form of a straight line and second side surface 12 may be in the form of a curve. In constant width portion 42, the lateral width of first flow path 10 is hardly changed in the direction toward second flow path 20. In third cross section S3, constant width portion 42 is constituted of a fifth side surface 15 and a sixth side surface 16. Fifth side surface 15 and sixth side surface 16 face each other. Each of fifth side surface 15 and sixth side surface 16 is in the form of a straight line.

As shown in FIG. 8, constant width portion 42 may be surrounded by annular groove 95. Fifth side surface 15 is contiguous to first side surface 11. Sixth side surface 16 is contiguous to second side surface 12. In third cross section S3, the lateral width (seventh width W7) of coolant inflow opening 5 may be larger than the lateral width (sixth width W6) of constant width portion 42. In third cross section S3, the lateral width (sixth width W6) of constant width portion 42 may be larger than the lateral width (fifth width W5) of narrowed portion 41. In third cross section S3, fifth width W5 becomes smaller as a distance from coolant inflow opening 5 is increased.

Second Embodiment

Next, a configuration of a cutting tool 200 according to a second embodiment of the present disclosure will be described. Cutting tool 200 according to the second embodiment is different from cutting tool 200 according to the first embodiment mainly in that the length of second main body portion 2 is long, and the other configurations of cutting tool 200 according to the second embodiment are the same as those of cutting tool 200 according to the first embodiment. Hereinafter, the configuration different from that of cutting tool 200 according to the first embodiment will be mainly described.

Figure 9:
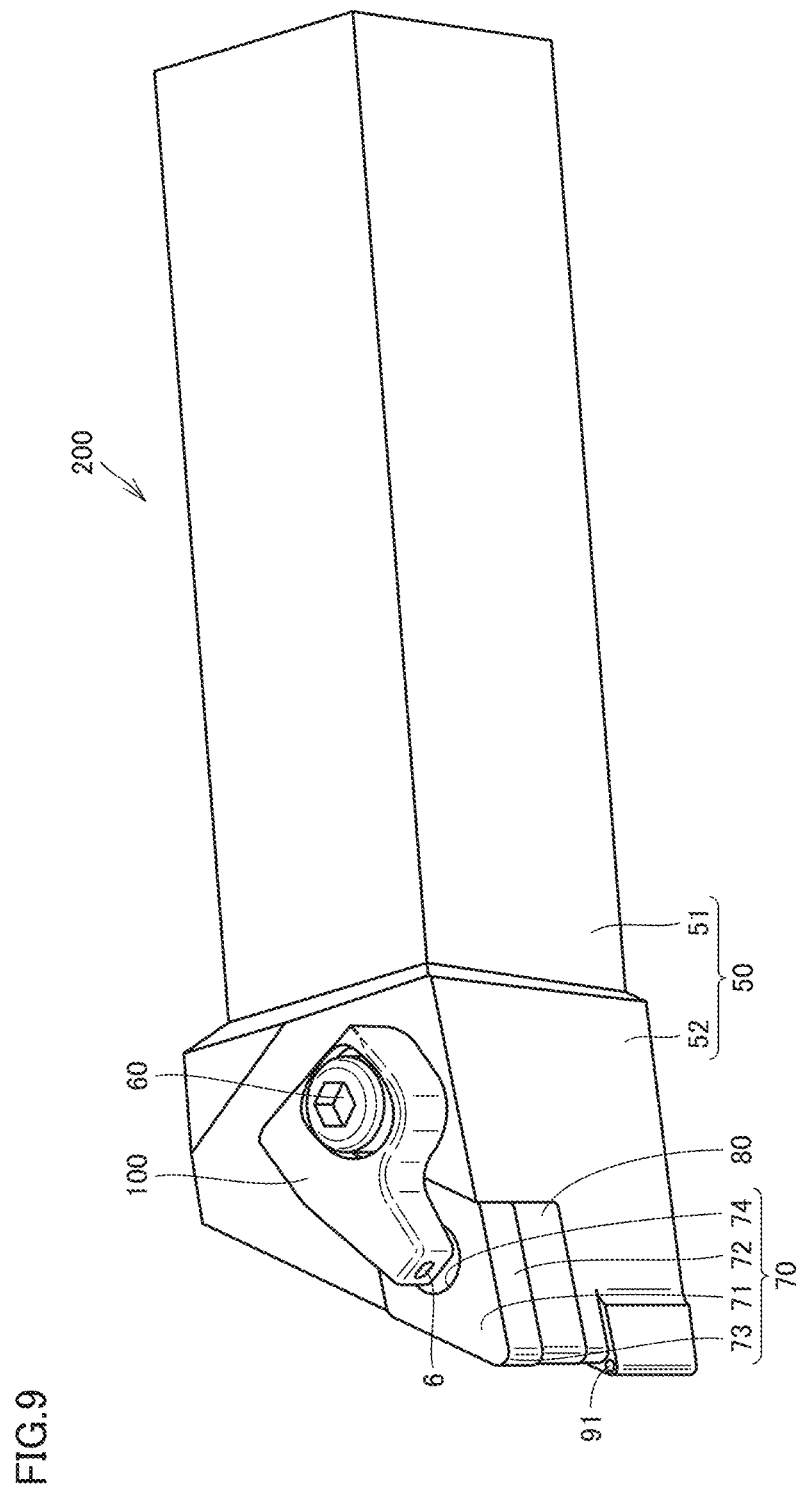
FIG. 9 is a schematic perspective view showing a configuration of a cutting tool according to a second embodiment.

FIG. 9 is a schematic perspective view showing the configuration of cutting tool 200 according to the second embodiment. As shown in FIG. 9, cutting tool 200 according to the first embodiment mainly includes holder 50, cutting insert 70, retaining member 100, underlying plate 80, and fastening member 60. Cutting insert 70 has top surface 71, outer peripheral surface 72, and cutting edge 73. When viewed in the direction perpendicular to top surface 71, the outer shape of top surface 71 is substantially a shape of rhombus. An angle of top surface 71 at a corner portion of cutting edge 73 of cutting tool 200 according to the second embodiment is smaller than the angle of top surface 71 at the corner portion of cutting edge 73 of cutting tool 200 according to the first embodiment.

Figure 10:
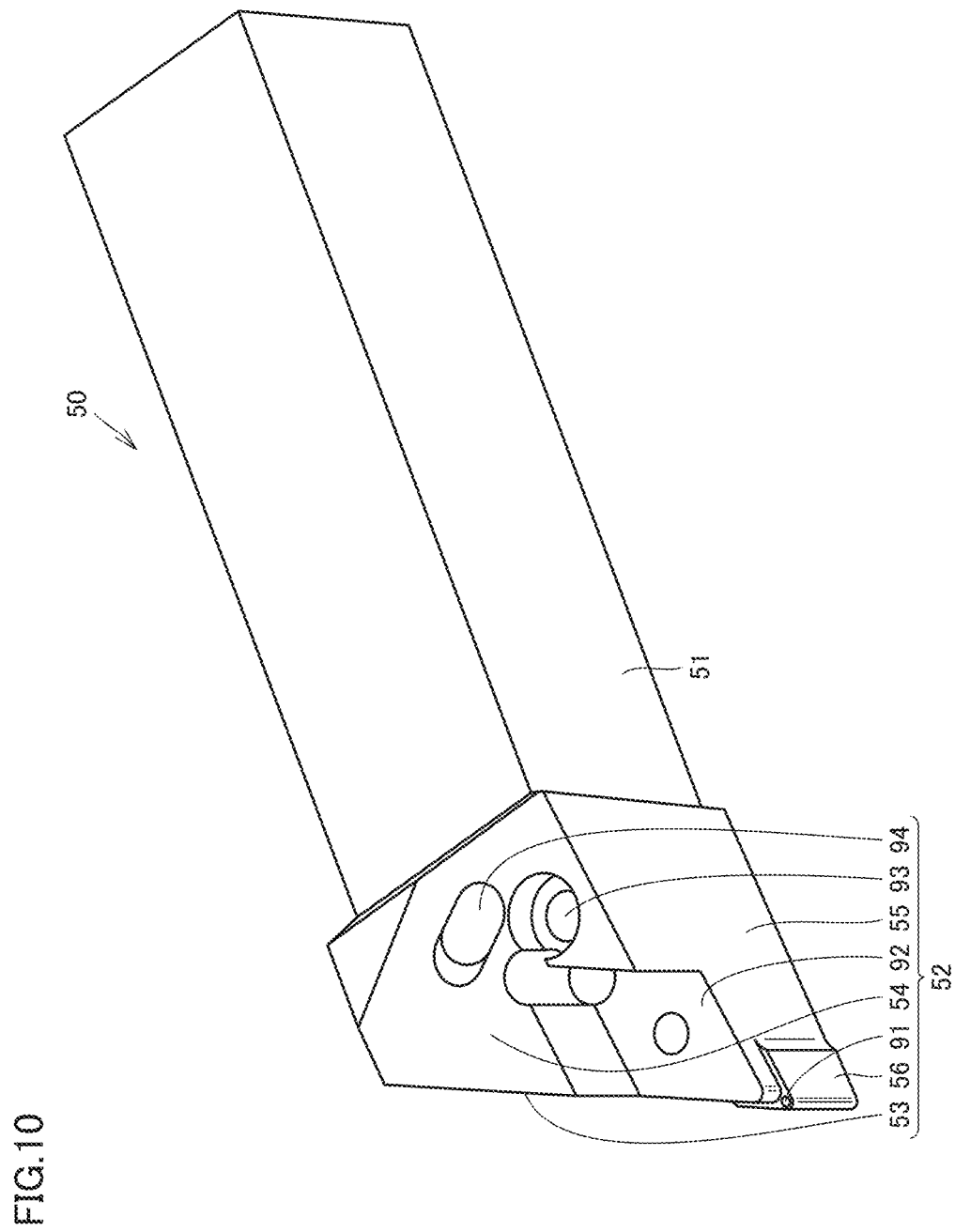
FIG. 10 is a schematic perspective view showing a configuration of a holder of the cutting tool according to the second embodiment.

FIG. 10 is a schematic perspective view showing a configuration of holder 50 of cutting tool 200 according to the second embodiment. As shown in FIG. 10, insert holding portion 52 of holder 50 of cutting tool 200 according to the second embodiment has upper surface 54, first end surface 53, and second end surface 55. Upper surface 54 is contiguous to each of first end surface 53 and second end surface 55. First end surface 53 is contiguous to second end surface 55. Insert holding portion 52 is provided with second recess 92, third recess 93, and fourth recess 94. Cutting insert 70 and underlying plate 80 are disposed in second recess 92. Second recess 92 is exposed at each of first end surface 53, second end surface 55, and upper surface 54. Third recess 93 is provided in upper surface 54. A portion of fastening member 60 is disposed in third recess 93. Second recess 92 and third recess 93 may be contiguous to each other.

Figure 11:
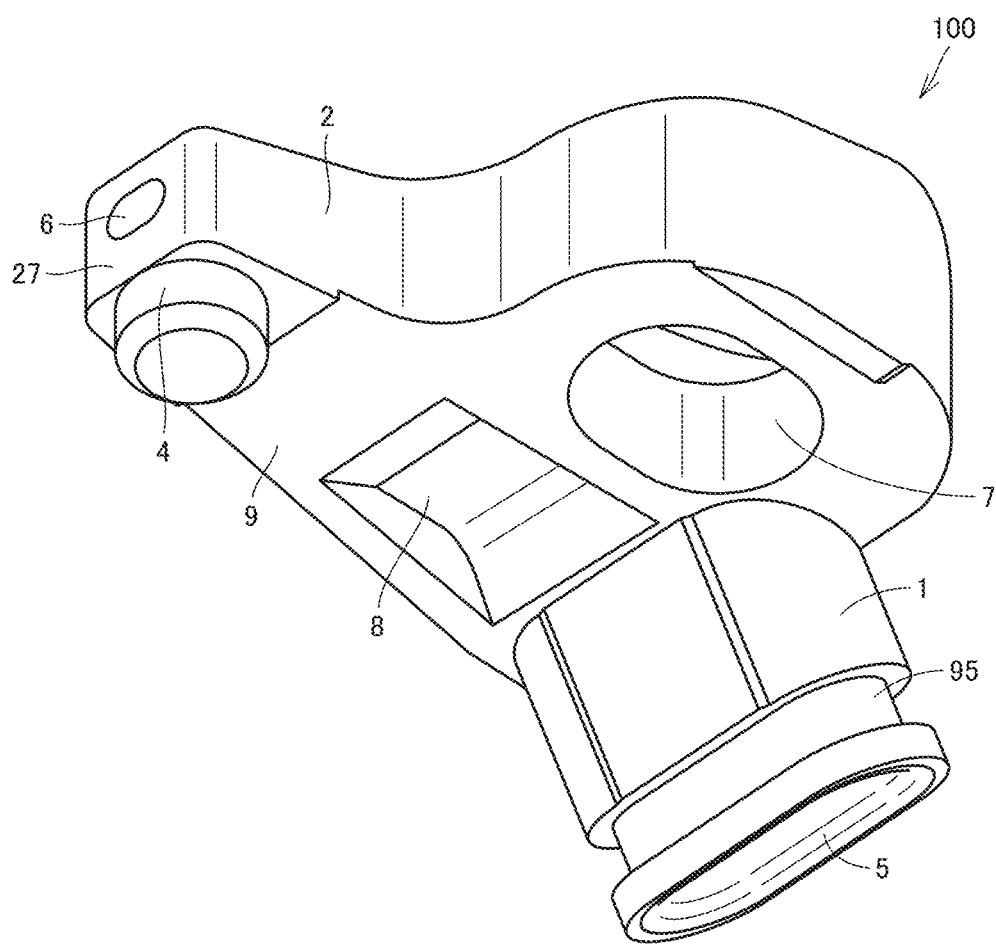
FIG. 11 is a schematic perspective view showing a configuration of a retaining member according to the second embodiment.
Figure 12:
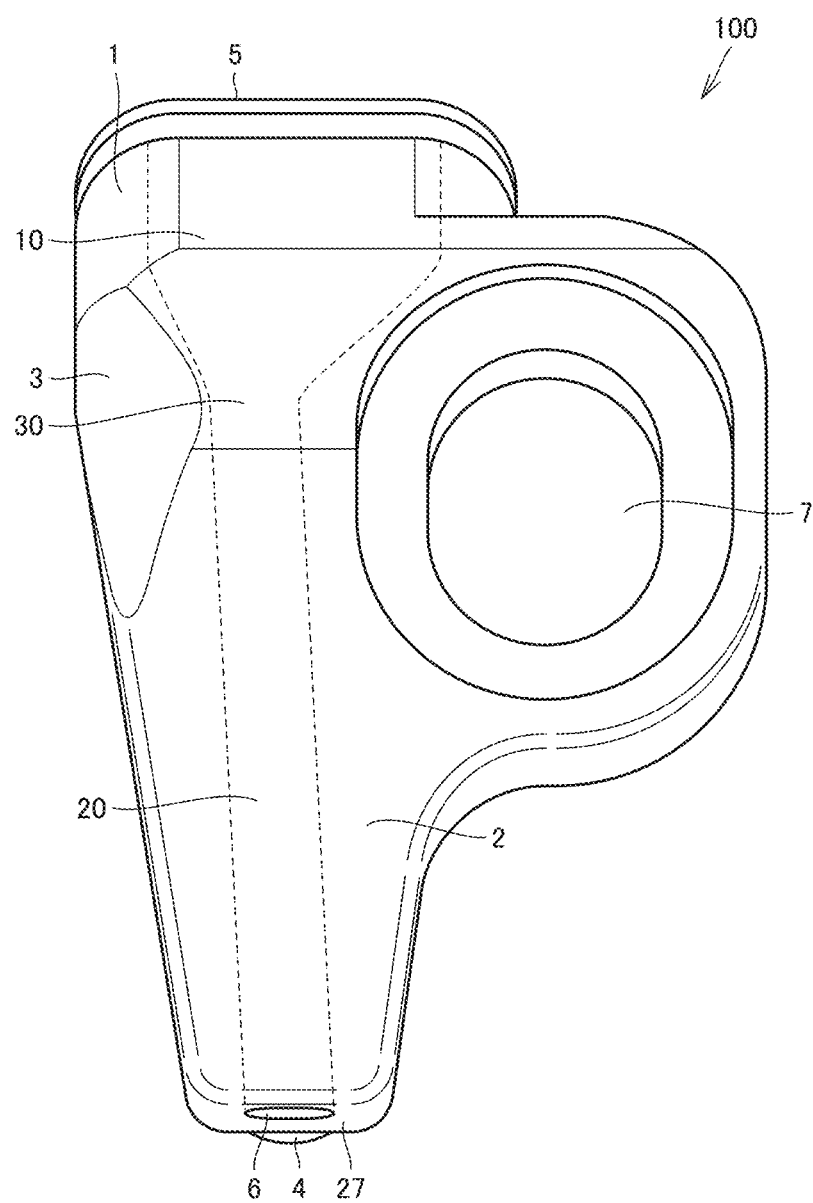
FIG. 12 is a schematic plan view showing the configuration of the retaining member according to the second embodiment.

FIG. 11 is a schematic perspective view showing a configuration of retaining member 100 according to the second embodiment. FIG. 12 is a schematic plan view showing the configuration of retaining member 100 according to the second embodiment. As shown in FIGS. 11 and 12, retaining member 100 according to the second embodiment mainly includes first main body portion 1, second main body portion 2, third main body portion 3, cylindrical portion 4, and bottom surface 9. In first main body portion 1, coolant inflow opening 5 is formed. In second main body portion 2, coolant ejection opening 6 is formed. Third main body portion 3 is located between first main body portion 1 and second main body portion 2.

Figure 13:
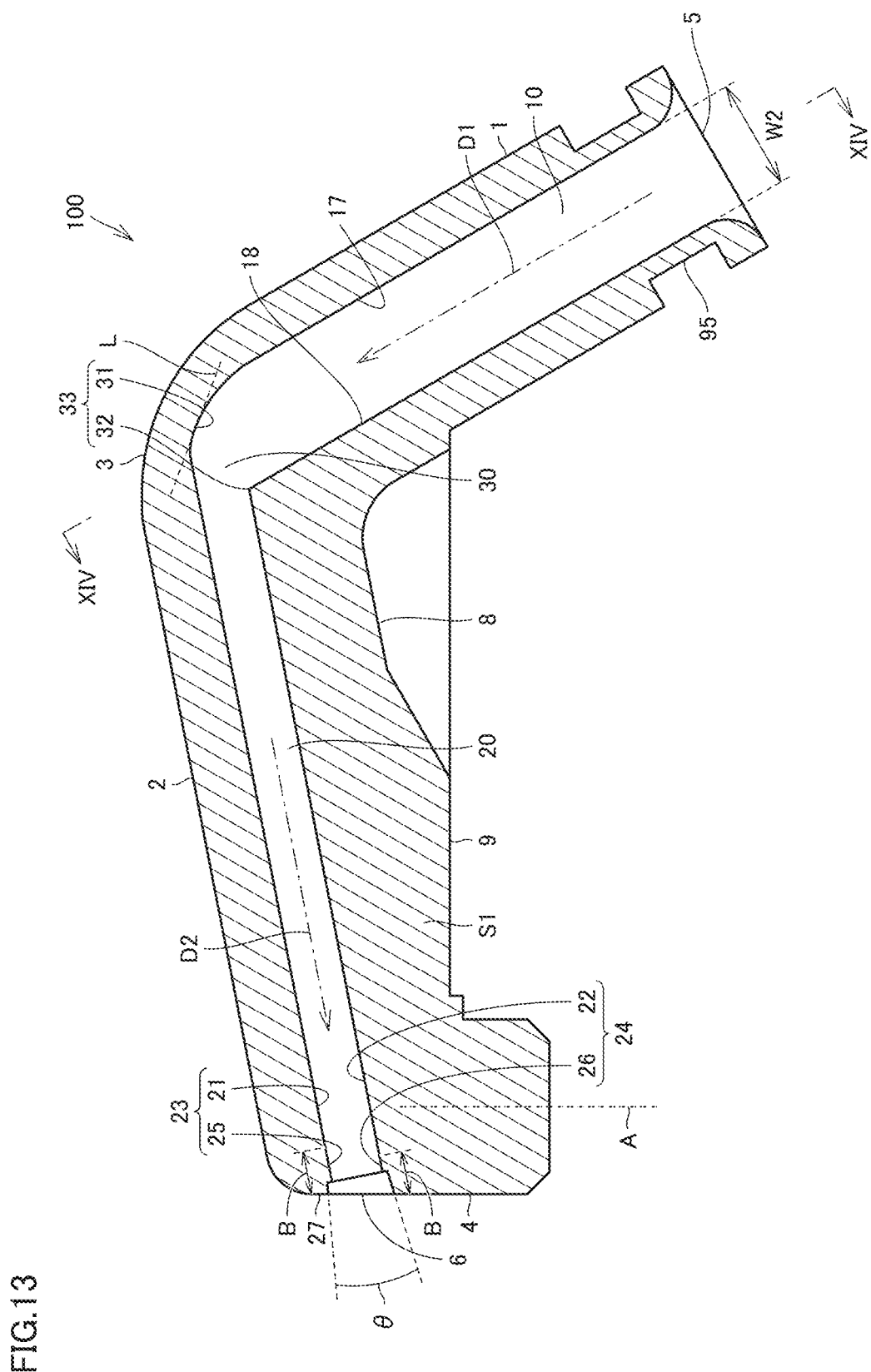
FIG. 13 is a schematic cross sectional view showing a first cross section of the retaining member according to the second embodiment.

FIG. 13 is a schematic cross sectional view showing first cross section S1 of retaining member 100 according to the second embodiment. First cross section S1 intersects each of first flow path 10, boundary flow path 30, and second flow path 20. As shown in FIG. 13, first flow path 10 is contiguous to coolant inflow opening 5. First flow path 10 extends along first direction D1. Second flow path 20 is contiguous to coolant ejection opening 6. Second flow path 20 extends along second direction D2. Second direction D2 is inclined with respect to first direction D1. The length of second main body portion 2 of retaining member 100 according to the second embodiment is longer than the length of second main body portion 2 of retaining member 100 according to the first embodiment. The length of second flow path 20 of retaining member 100 according to the second embodiment is longer than the length of second flow path 20 of retaining member 100 according to the first embodiment.

Figure 14:
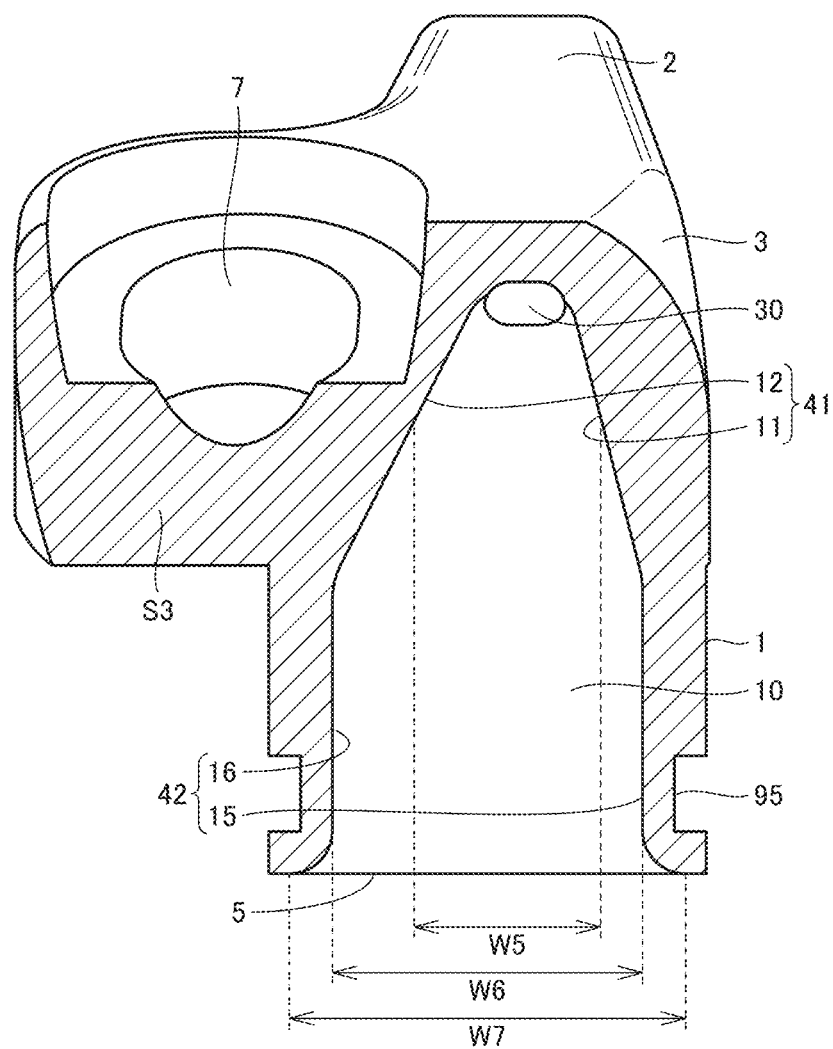
FIG. 14 is a schematic cross sectional view showing a third cross section of the retaining member according to the second embodiment.

FIG. 14 is a schematic cross sectional view showing third cross section S3 of retaining member 100 according to the second embodiment. The cross section shown in FIG. 14 corresponds to a cross section taken along a line XIV-XIV in FIG. 13. Third cross section S3 is parallel to each of first direction D1 and the lateral direction of first flow path 10. As shown in FIG. 14, first flow path 10 has narrowed portion 41 and constant width portion 42. In narrowed portion 41, the lateral width of first flow path 10 is monotonously decreased in the direction toward second flow path 20. In third cross section S3, narrowed portion 41 is constituted of first side surface 11 and second side surface 12. First side surface 11 and second side surface 12 face each other. Each of first side surface 11 and second side surface 12 is in the form of a straight line. Each of first side surface 11 and second side surface 12 may be inclined with respect to first direction D1. In third cross section S3, the direction of inclination of first side surface 11 with respect to first direction D1 may be opposite to the direction of inclination of second side surface 12 with respect to first direction D1.

Third Embodiment

Next, a configuration of a cutting tool 200 according to a third embodiment of the present disclosure will be described. Cutting tool 200 according to the third embodiment is different from cutting tool 200 according to the second embodiment mainly in that each of first boundary wall surface 31 and second boundary wall surface 32 is smoothly curved, and the other configurations of cutting tool 200 according to the third embodiment are the same as those of cutting tool 200 according to the second embodiment. Hereinafter, the configuration different from that of cutting tool 200 according to the second embodiment will be mainly described.

Figure 15:
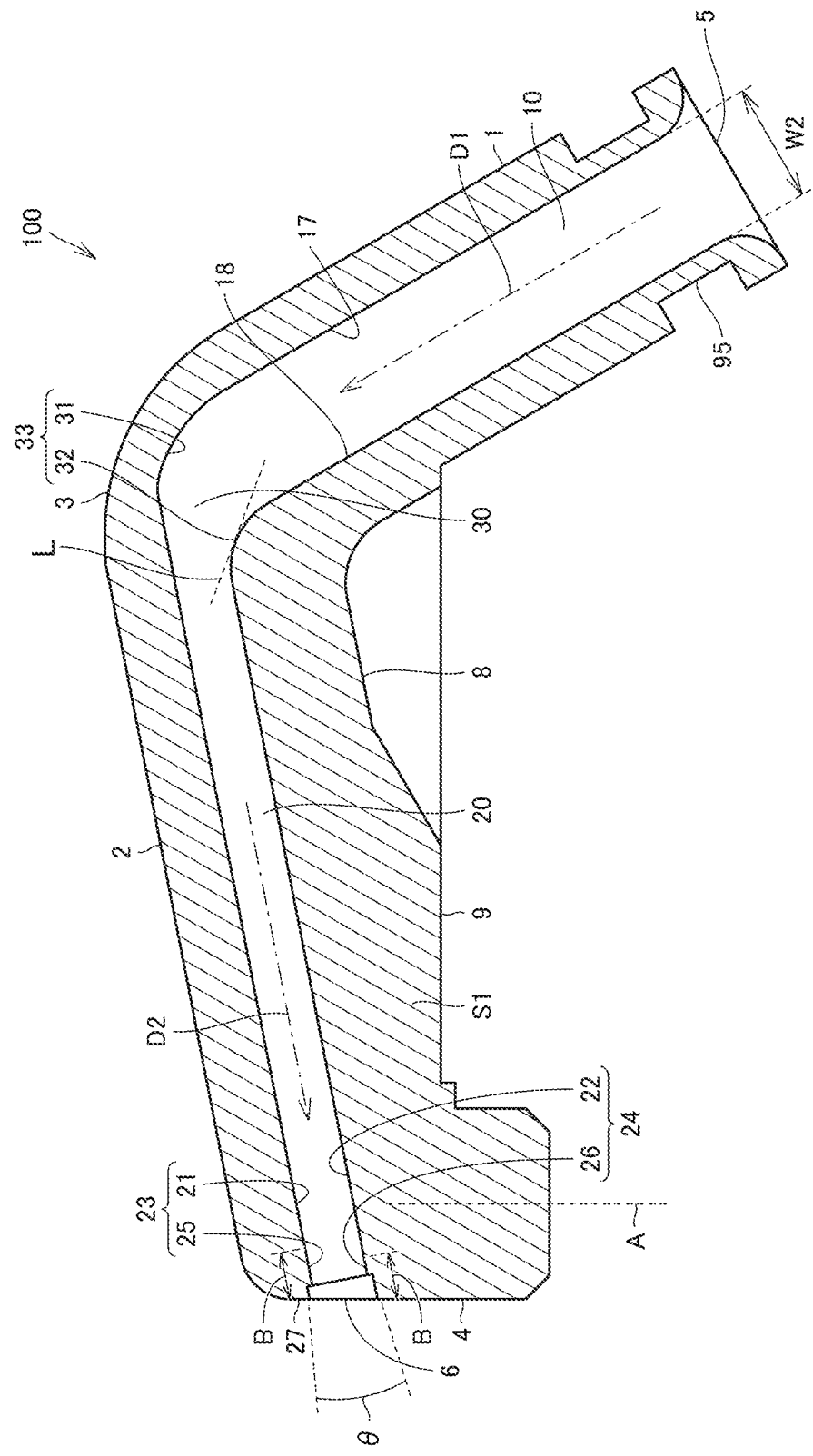
FIG. 15 is a schematic cross sectional view showing a first cross section of a retaining member according to a third embodiment.

FIG. 15 is a schematic cross sectional view showing first cross section S1 of retaining member 100 according to the third embodiment. First cross section S1 intersects each of first flow path 10, boundary flow path 30, and second flow path 20. As shown in FIG. 15, first flow path 10 is contiguous to coolant inflow opening 5. First flow path 10 extends along first direction D1. Second flow path 20 is contiguous to coolant ejection opening 6. Second flow path 20 extends along second direction D2. Second direction D2 is inclined with respect to first direction D1.

As shown in FIG. 15, in first cross section S1, the pair of boundary wall surfaces 33 have first boundary wall surface 31 and second boundary wall surface 32. Second boundary wall surface 32 may be located between first boundary wall surface 31 and bottom surface 9. According to retaining member 100 of the third embodiment, an inclination of a tangent to at least one of the pair of boundary wall surfaces 33 is continuously changed. Specifically, each of first boundary wall surface 31 and second boundary wall surface 32 is smoothly curved. From another viewpoint, it can be said that each of the inclination of the tangent to first boundary wall surface 31 and the inclination of the tangent to second boundary wall surface 32 is continuously changed. First boundary wall surface 31 is curved to protrude on the outer side. Second boundary wall surface 32 is curved to protrude on the inner side.

In the above description, it has been illustrated that each of the inclination of the tangent to first boundary wall surface 31 and the inclination of the tangent to second boundary wall surface 32 is continuously changed; however, the configuration of retaining member 100 according to the present disclosure is not limited to this. In retaining member 100 according to the present disclosure, the inclination of the tangent to first boundary wall surface 31 may be continuously changed and the inclination of the tangent to second boundary wall surface 32 may be discontinuously changed, or the inclination of the tangent to first boundary wall surface 31 may be discontinuously changed and the inclination of the tangent to second boundary wall surface 32 may be continuously changed.

Next, functions and effects of retaining member 100 and cutting tool 200 according to each of the above-described embodiments will be described.

Retaining member 100 for fixing cutting insert 70 to holder 50 includes first main body portion 1, second main body portion 2, and third main body portion 3. In first main body portion 1, coolant inflow opening 5 is formed. In second main body portion 2, coolant ejection opening 6 is formed. Third main body portion 3 is located between first main body portion 1 and second main body portion 2. First flow path 10 is formed in first main body portion 1. Second flow path 20 is formed in second main body portion 2. Boundary flow path 30 is formed in third main body portion 3 so as to be contiguous to each of first flow path 10 and second flow path 20.

When the shape of a flow path is complicated, energy loss of a fluid flowing in the flow path becomes large. In particular, when a wall surface of the flow path has an angular portion, the energy loss of the fluid is large at the angular portion. As a result, the rate of the fluid ejected from coolant ejection opening 6 becomes low.

According to retaining member 100 and cutting tool 200 according to each of the above-described embodiments, boundary flow path 30 is constituted of the pair of boundary wall surfaces 33 facing each other in first cross section S1 intersecting each of first flow path 10, boundary flow path 30, and second flow path 20. The inclination of the tangent to at least one of the pair of boundary wall surfaces 33 is continuously changed. That is, at least one boundary wall surface of the pair of boundary wall surfaces 33 is smoothly curved. Therefore, with retaining member 100 and cutting tool 200 according to each of the above-described embodiments, the energy loss of the fluid can be reduced as compared with a case where both the boundary wall surfaces of the pair of boundary wall surfaces 33 are not smoothly curved.

According to retaining member 100 and cutting tool 200 according to each of the above-described embodiments, the lateral width of first flow path 10 is larger than the longitudinal width of first flow path 10, and the lateral width of second flow path 20 is larger than the longitudinal width of second flow path 20. Thus, coolant spread in the lateral direction can be ejected from coolant ejection opening 6.

According to retaining member 100 and cutting tool 200 according to each of the above-described embodiments, first flow path 10 may have narrowed portion 41 in which the lateral width of first flow path 10 is monotonously decreased in the direction toward second flow path 20. Under the same energy of the fluid introduced into the flow path, the rate of the fluid in a region of the flow path having a smaller cross sectional area is higher than the rate of the fluid in a region of the flow path having a larger cross sectional area. Since first flow path 10 has narrowed portion 41 in which the lateral width of first flow path 10 is monotonously decreased in the direction toward second flow path 20, the rate of the fluid can be increased in the direction from first flow path 10 toward second flow path 20 while reducing the energy loss of the fluid.

According to retaining member 100 and cutting tool 200 according to each of the above-described embodiments, retaining member 100 may further include cylindrical portion 4 protruding from second main body portion 2. In first cross section S1, ejection surface 27 in which coolant ejection opening 6 is formed may be parallel to central axis A of cylindrical portion 4. In the case where ejection surface 27 in which coolant ejection opening 6 is formed is parallel to central axis A of cylindrical portion 4, the divergence angle of the coolant ejected from coolant ejection opening 6 can be made smaller than that in the case where ejection surface 27 in which coolant ejection opening 6 is formed is inclined with respect to central axis A of cylindrical portion 4.

According to retaining member 100 and cutting tool 200 according to each of the above-described embodiments, second flow path 20 may be constituted of third side surface 23 and fourth side surface 24 facing each other in first cross section S1. Third side surface 23 may have first wall surface 21 separated by more than or equal to 1 mm from coolant ejection opening 6. Fourth side surface 24 may have second wall surface 22 separated by more than or equal to 1 mm from coolant ejection opening 6. First wall surface 21 may be parallel to second wall surface 22. In the case where first wall surface 21 is parallel to second wall surface 22, the fluid is facilitated to flow along the direction parallel to each of first wall surface 21 and second wall surface 22 as compared with a case where first wall surface 21 is inclined with respect to second wall surface 22. Therefore, the divergence angle of the coolant ejected from coolant ejection opening 6 can be made small. Thus, the coolant can be discharged intensively onto cutting edge 73 of cutting insert 70.

EXAMPLES (Preparation of Samples)

Figure 16:
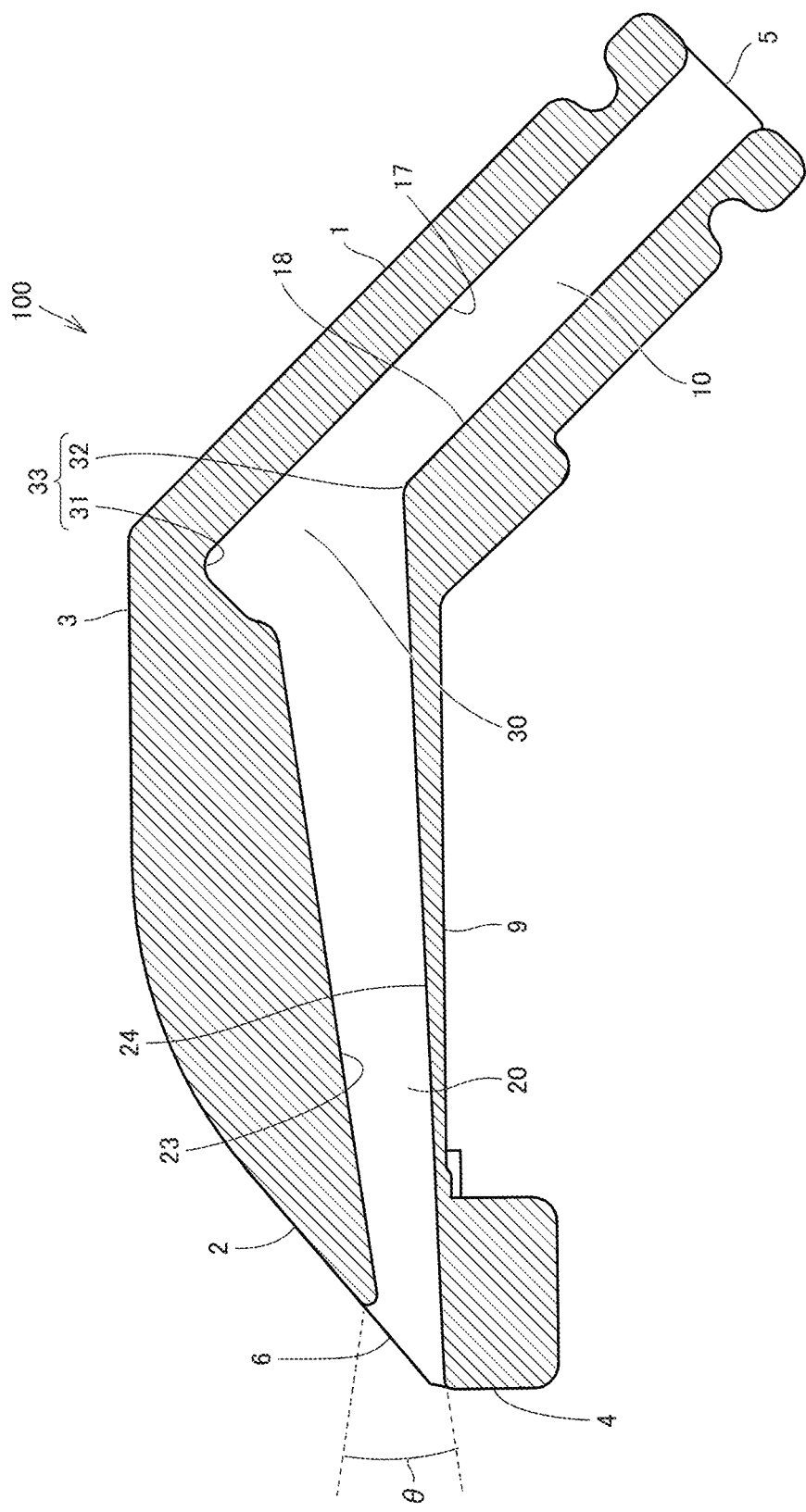
FIG. 16 is a schematic cross sectional view showing a configuration of a retaining member according to a sample 1.

First, a retaining member 100 according to a sample 1 and a retaining member 100 according to a sample 2 were prepared. Retaining member 100 according to sample 1 serves as a comparative example. FIG. 16 is a schematic cross sectional view showing a configuration of retaining member 100 according to sample 1. As shown in FIG. 16, according to retaining member 100 of sample 1, boundary flow path 30 is constituted of first boundary wall surface 31 and second boundary wall surface 32 in first cross section S1 intersecting each of first flow path 10, boundary flow path 30, and second flow path 20. Each of first boundary wall surface 31 and second boundary wall surface 32 is angular. That is, the inclination of the tangent to each of first boundary wall surface 31 and second boundary wall surface 32 is discontinuously changed.

Retaining member 100 according to sample 2 serves as an example of the present disclosure. FIG. 15 shows a configuration of retaining member 100 according to sample 2. According to retaining member 100 of sample 2, boundary flow path 30 is constituted of first boundary wall surface 31 and second boundary wall surface 32 in first cross section S1 intersecting each of first flow path 10, boundary flow path 30, and second flow path 20. Each of first boundary wall surface 31 and second boundary wall surface 32 is smoothly curved. That is, the inclination of the tangent to each of first boundary wall surface 31 and second boundary wall surface 32 is continuously changed.

(Evaluation Conditions)

Next, coolant was introduced into coolant inflow opening 5 of each of retaining member 100 according to sample 1 and retaining member 100 according to sample 2, and divergence angle $\theta$ of the coolant ejected from coolant ejection opening 6 was measured Divergence angle $\theta$ was measured by photographing a diverged state of the coolant in a direction perpendicular to first cross section S1. A value of the half of divergence angle $\theta$ of the coolant was defined as a half apical angle. Assuming that the divergence of the coolant is in an ideal form of cone, the solid angle of the coolant was calculated based on the half apical angle of the coolant.

(Evaluation Results)

TABLE 1

| Sample Number | Half Apical Angle (°) | Solid Angle (Steradian) |
|---|---|---|
| Sample 1 | 10 | 0.03 |
| Sample 2 | 2 | 0.01 |

Table 1 shows the half apical angle and solid angle of the coolant ejected from coolant ejection opening 6 of each of retaining member 100 according to sample 1 and retaining member 100 according to sample 2. As shown in Table 1, the half apical angle and solid angle of the coolant ejected from coolant ejection opening 6 of retaining member 100 according to sample 1 were 10° and 0.03 steradian, respectively. On the other hand, the half apical angle and solid angle of the coolant ejected from coolant ejection opening 6 of retaining member 100 according to sample 2 were 2' and 0.01 steradian, respectively. It was confirmed that with retaining member 100 according to sample 2, the divergence angle of the coolant can be made smaller as compared with retaining member 100 according to sample 1.

The embodiments and examples disclosed herein are illustrative and non-restrictive in any respect. The scope of the present invention is defined by the terms of the claims, rather than the embodiments and examples described above, and is intended to include any modifications within the scope and meaning equivalent to the terms of the claims.

REFERENCE SIGNS LIST

1: first main body portion; 2: second main body portion; 3: third main body portion, 4: cylindrical portion; 5: coolant inflow opening; 6: coolant ejection opening; 7: through hole; 8: first recess; 9: bottom surface; 10: first flow path; 11: first side surface; 12: second side surface; 15: fifth side surface; 16: sixth side surface; 17: seventh side surface; 18: eighth side surface; 20: second flow path; 21: first wall surface; 22: second wall surface; 23: third side surface; 24: fourth side surface; 25: fifth wall surface; 26: sixth wall surface; 27: ejection surface; 30: boundary flow path; 31: first boundary wall surface, 32: second boundary wall surface; 33: boundary wall surface; 41: narrowed portion; 42: constant width portion; 50: holder; 51: supporting portion; 52: insert holding portion; 53: first end surface; 54: upper surface; 55: second end surface; 56: protrusion; 60: fastening member; 70: cutting insert; 71: top surface; 72: outer peripheral surface; 73: cutting edge; 74: hole portion; 80: underlying plate; 91: coolant sending-out opening; 92: second recess; 93: third recess; 94: fourth recess; 95: annular groove; 100: retaining member. 200: cutting tool; A: central axis; B: distance; D1: first direction; D2: second direction; L: tangent; S1: first cross section; S2: second cross section; S3: third cross section; W1: first width; W2: second width; W3: third width; W4: fourth width; W5: fifth width; W6: sixth width; W7: seventh width; θ: divergence angle.

The invention claimed is:

1. A retaining member for fixing a cutting insert to a holder, the retaining member comprising:
a first main body portion in which a coolant inflow opening is formed;
a second main body portion in which a coolant ejection opening is formed in an ejection surface such that the ejection surface completely surrounds the coolant ejection opening;
a cylindrical portion protruding from the second main body portion; and
a third main body portion located between the first main body portion and the second main body portion, wherein
a first flow path is formed in the first main body portion so as to be contiguous to the coolant inflow opening and extend along a first direction,
a second flow path is formed in the second main body portion so as to be contiguous to the coolant ejection opening and extend along a second direction inclined with respect to the first direction,
a boundary flow path is formed in the third main body portion so as to be contiguous to each of the first flow path and the second flow path,
the boundary flow path is constituted of a pair of boundary wall surfaces facing each other in a first cross section intersecting each of the first flow path, the boundary flow path, and the second flow path, an inclination of a tangent to at least one of the pair of boundary wall surfaces is continuously changed,
in a second cross section perpendicular to a direction in which coolant flows, a lateral width of the first flow path is larger than a longitudinal width of the first flow path and a lateral width of the second flow path is larger than a longitudinal width of the second flow path when a longitudinal direction represents a direction in which the pair of boundary wall surfaces face each other and a lateral direction represents a direction perpendicular to the longitudinal direction, and
in the first cross section, the entire ejection surface is parallel to a central axis of the cylindrical portion.

2. The retaining member according to claim 1, wherein the first flow path has a narrowed portion in which the lateral width of the first flow path is monotonously decreased in a direction toward the second flow path.

3. The retaining member according to claim 2, wherein in a third cross section parallel to each of the first direction and the lateral direction, the narrowed portion is constituted of a first side surface and a second side surface facing each other, and
the first side surface is in a form of a straight line and the second side surface is in a form of a curve.

4. The retaining member according to claim 2, wherein in a third cross section parallel to each of the first direction and the lateral direction, the narrowed portion is constituted of a first side surface and a second side surface facing each other,
each of the first side surface and the second side surface is in a form of a straight line, and
each of the first side surface and the second side surface is inclined with respect to the first direction.

5. The retaining member according to claim 1, wherein in the first cross section, the second flow path is constituted of a third side surface and a fourth side surface facing each other,
the third side surface has a first wall surface separated by more than or equal to 1 mm from the coolant ejection opening,
the fourth side surface has a second wall surface separated by more than or equal to 1 mm from the coolant ejection opening, and
the first wall surface is parallel to the second wall surface.

6. The retaining member according to claim 1, wherein the first flow path has a narrowed portion in which the lateral width of the first flow path is monotonously decreased in a direction toward the second flow path,
wherein
in the first cross section, the second flow path is constituted of a third side surface and a fourth side surface facing each other,
the third side surface has a first wall surface separated by more than or equal to 1 mm from the coolant ejection opening,
the fourth side surface has a second wall surface separated by more than or equal to 1 mm from the coolant ejection opening, and
the first wall surface is parallel to the second wall surface.

7. A cutting tool comprising:
the retaining member according to claim 1; and
the holder on which the retaining member is disposed.

8. The cutting tool according to claim 7, wherein the cutting insert is in contact with the retaining member.

9. The cutting tool according to claim 7, wherein the first flow path has a narrowed portion in which the lateral width of the first flow path is monotonously decreased in a direction toward the second flow path.

10. The cutting tool according to claim 9, wherein
in a third cross section parallel to each of the first direction and the lateral direction, the narrowed portion is constituted of a first side surface and a second side surface facing each other, and
the first side surface is in a form of a straight line and the second side surface is in a form of a curve.

11. The cutting tool according to claim 9, wherein
in a third cross section parallel to each of the first direction and the lateral direction, the narrowed portion is constituted of a first side surface and a second side surface facing each other,
each of the first side surface and the second side surface is in a form of a straight line, and
each of the first side surface and the second side surface is inclined with respect to the first direction.

12. The cutting tool according to claim 7, wherein
in the first cross section, the second flow path is constituted of a third side surface and a fourth side surface facing each other,
the third side surface has a first wall surface separated by more than or equal to 1 mm from the coolant ejection opening,
the fourth side surface has a second wall surface separated by more than or equal to 1 mm from the coolant ejection opening, and
the first wall surface is parallel to the second wall surface.

13. The cutting tool according to claim 7, wherein
the first flow path has a narrowed portion in which the lateral width of the first flow path is monotonously decreased in a direction toward the second flow path, wherein
in the first cross section, the second flow path is constituted of a third side surface and a fourth side surface facing each other,
the third side surface has a first wall surface separated by more than or equal to 1 mm from the coolant ejection opening,
the fourth side surface has a second wall surface separated by more than or equal to 1 mm from the coolant ejection opening, and
the first wall surface is parallel to the second wall surface.

14. A retaining member for fixing a cutting insert to a holder, the retaining member comprising:
a first main body portion in which a coolant inflow opening is formed;
a second main body portion in which a coolant ejection opening is formed; and
a third main body portion located between the first main body portion and the second main body portion, wherein
a first flow path is formed in the first main body portion so as to be contiguous to the coolant inflow opening and extend along a first direction,
a second flow path is formed in the second main body portion so as to be contiguous to the coolant ejection opening and extend along a second direction inclined with respect to the first direction,
a boundary flow path is formed in the third main body portion so as to be contiguous to each of the first flow path and the second flow path,
the boundary flow path is constituted of a pair of boundary wall surfaces facing each other in a first cross section intersecting each of the first flow path, the boundary flow path, and the second flow path,
an inclination of a tangent to at least one of the pair of boundary wall surfaces is continuously changed,
in a second cross section perpendicular to a direction in which coolant flows, a lateral width of the first flow path is larger than a longitudinal width of the first flow path and a lateral width of the second flow path is larger than a longitudinal width of the second flow path when a longitudinal direction represents a direction in which the pair of boundary wall surfaces face each other and a lateral direction represents a direction perpendicular to the longitudinal direction, and
in a third cross section parallel to each of the first direction and the lateral direction, the narrowed portion is constituted of a first side surface and a second side surface facing each other, such that either
the first side surface is in a form of a straight line and the second side surface is in a form of a curve, or
each of the first side surface and the second side surface is in a form of a straight line, and each of the first side surface and the second side surface is inclined with respect to the first direction.

15. A retaining member for fixing a cutting insert to a holder, the retaining member comprising:
a first main body portion in which a coolant inflow opening is formed;
a second main body portion in which a coolant ejection opening is formed; and
a third main body portion located between the first main body portion and the second main body portion, wherein
a first flow path is formed in the first main body portion so as to be contiguous to the coolant inflow opening and extend along a first direction,
a second flow path is formed in the second main body portion so as to be contiguous to the coolant ejection opening and extend along a second direction inclined with respect to the first direction,
a boundary flow path is formed in the third main body portion so as to be contiguous to each of the first flow path and the second flow path,
the boundary flow path is constituted of a pair of boundary wall surfaces facing each other in a first cross section intersecting each of the first flow path, the boundary flow path, and the second flow path,
an inclination of a tangent to at least one of the pair of boundary wall surfaces is continuously changed,
in a second cross section perpendicular to a direction in which coolant flows, a lateral width of the first flow path is larger than a longitudinal width of the first flow path and a lateral width of the second flow path is larger than a longitudinal width of the second flow path when a longitudinal direction represents a direction in which the pair of boundary wall surfaces face each other and a lateral direction represents a direction perpendicular to the longitudinal direction,
in the first cross section, the second flow path is constituted of a third side surface and a fourth side surface facing each other,
the third side surface has a first wall surface separated by more than or equal to 1 mm from the coolant ejection opening,
the fourth side surface has a second wall surface separated by more than or equal to 1 mm from the coolant ejection opening, and
the first wall surface is parallel to the second wall surface.

16. The retaining member according to claim 14, further comprising a cylindrical portion protruding from the second main body portion, wherein in the first cross section, an ejection surface in which the coolant ejection opening is formed is parallel to a central axis of the cylindrical portion.

17. The retaining member according to claim 14, wherein in the first cross section, the second flow path is constituted of a third side surface and a fourth side surface facing each other, the third side surface has a first wall surface separated by more than or equal to 1 mm from the coolant ejection opening, the fourth side surface has a second wall surface separated by more than or equal to 1 mm from the coolant ejection opening, and the first wall surface is parallel to the second wall surface.

18. The retaining member according to claim 15, further comprising a cylindrical portion protruding from the second main body portion, wherein in the first cross section, an ejection surface in which the coolant ejection opening is formed is parallel to a central axis of the cylindrical portion.

19. A cutting tool comprising:

the retaining member according to claim 14; and the holder on which the retaining member is disposed.

20. A cutting tool comprising:

the retaining member according to claim 15; and the holder on which the retaining member is disposed.

* * * * *